United States Patent [19]

Hawthorn et al.

[11] Patent Number: 4,884,281
[45] Date of Patent: Nov. 28, 1989

[54] LOW COST/POWER VISIBLE LIGHT SOLID-STATE LASER

[75] Inventors: Pliny S. Hawthorn, New Carlisle; Mark D. Sobottke, Kettering, both of Ohio

[73] Assignee: Spectra-Physics, Inc., San Jose, Calif.

[21] Appl. No.: 242,792

[22] Filed: Sep. 9, 1988

[51] Int. Cl.$^4$ .............................................. H01S 3/091
[52] U.S. Cl. ......................................... 372/75; 372/98; 372/92
[58] Field of Search ...................... 372/97, 92, 98, 75, 372/71, 72

[56] References Cited

U.S. PATENT DOCUMENTS

| | | |
|---|---|---|
| 3,982,201 | 9/1976 | Rosenkrantz . |
| 4,035,742 | 7/1977 | Schiffner . |
| 4,464,759 | 8/1984 | Haus et al. ............................. 372/97 |
| 4,618,957 | 10/1986 | Liu . |
| 4,653,056 | 3/1987 | Baer et al. . |
| 4,656,635 | 4/1987 | Baer et al. . |
| 4,665,529 | 5/1987 | Baer et al. . |
| 4,701,929 | 10/1987 | Baer et al. . |
| 4,723,257 | 2/1988 | Baer et al. . |
| 4,730,335 | 3/1988 | Clark et al. ............................. 372/75 |
| 4,731,787 | 3/1988 | Fan et al. . |
| 4,731,795 | 3/1988 | Clark et al. ............................. 372/71 |
| 4,739,507 | 4/1988 | Byer et al. . |
| 4,756,003 | 7/1988 | Baer et al. . |
| 4,761,786 | 8/1988 | Baer . |

OTHER PUBLICATIONS

Stable LiNdP$_4$O$_{12}$ Miniature Laser, Applied Optics, vol. 18, No. 6, Mar. 1979.
Nd-Ultraphosphate Laser, Appl. Phys. Lett., vol. 22, No. 10, May 1973.
Chinn, S. R., Intracavity Second-Harmonic Generation in a Nd Pentaphosphate Laser, Appl. Phys. Lett., vol. 29, No. 3, Aug. 1, 1976.
Gain Switch of a Monolithic Single Frequency Laser-Diode-Excited Nd:YAG Laser, Optics Letters, vol. 10, No. 10, Oct. 1985.
Diode-Pumped Solid-State Laser Markets and Production Expand, Laser Focus/Electro-Optics.
Randall et al., Diode-Laser-Pumped Nd:YAG Laser Injection Seeding System.
Byer, Diode Laser Pumped Solid State Lasers.
Chinn et al., Low Threshold, Transversely Excited NdP$_5$O$_{14}$ Laser, IEEE J. of Quantum Electronics, Sep. 1975.
Budin et al., On the Design of Neodymium Miniature Lasers, IEEE J. of Quantum Electronics, vol. QE-14, No. 11, Nov. 1978.

(List continued on next page.)

Primary Examiner—Léon Scott, Jr.
Attorney, Agent, or Firm—Killworth, Gottman, Hagan & Schaeff

[57] ABSTRACT

A compact, laser diode pumped, high efficiency, solid-state laser comprises an output coupler mirror forming a front end of a laser cavity. A back end of the laser cavity is formed by a rear mirror through which emissions from a laser diode pass for pumping a laser chip of stoichiometric lasing material. A frequency doubler chip is positioned immediately adjacent the laser chip to double the frequency of light generated by the laser chip and thereby halve its wavelength. The laser chip is bonded to the frequency doubler chip by coupling material having a refractive index matched to the chips to nearly eliminate reflections at the bonded chip surfaces. Such bonding increases the effective Q of the laser cavity which receives the bonded combination of the laser chip and the doubler chip at a beam waist defined within the laser cavity by means of beam shaping with the laser chip being positioned to receive pumping energy from a laser diode through the rear mirror of the laser cavity. Spiking or peaking of the output laser light is effected by gain switching, phase modulation or by imparting vibratory motion to the bonded combination of the laser chip and the frequency doubler chip.

18 Claims, 2 Drawing Sheets

OTHER PUBLICATIONS

Budin et al., Miniature Nd-Pentaphosphate Laser with Bonded Mirrors Side Pumped with Low-Current-Density LED's Appl. Phys. Lett., vol. 33, No. 4, Aug. 15, 1978.

Kubodera et al., Spike-Mode Oscillations in Laser-Diode Pumped $LiNdP_4O_{12}$ Lasers, IEEE J. of Quantum Electronics, vol. QE-17, No. 6, Jun. 1981.

Barnes, N. P., Diode-Pumped Solid-State Lasers, J. Appl. Phys., vol. 44, No. 1, Jan. 1973.

Chesler et al., "Miniature Diode-Pumped Nd:YAIG Lasers", Appl. Phys. Lett., vol. 23, No. 5, Sep. 1, 1973.

Culshaw et al., Efficient Frequency-Doubled Single-Frequency Nd:YAG Laser, IEEE J. of Quantum Electronics, vol. QE-10, No. 2, Feb. 1974.

Baer, Thomas M., Diode Laser Pumping of Solid-State Lasers, Laser Focus, Jun. 1986, Ed.

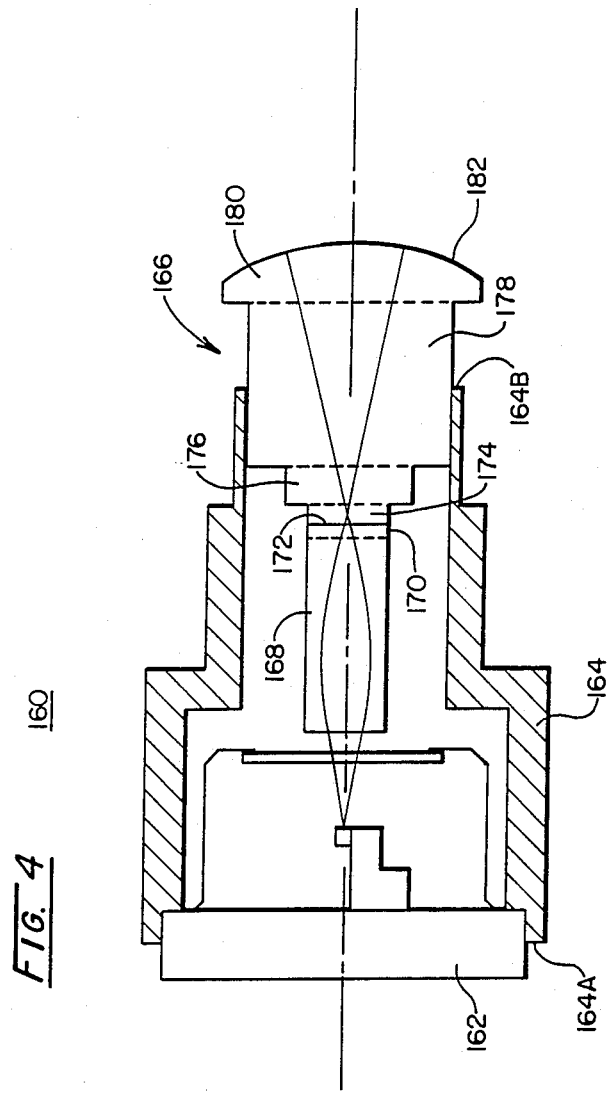

LOW COST/POWER VISIBLE LIGHT SOLID-STATE LASER

BACKGROUND OF THE INVENTION

The present invention relates generally to lasers and, more particularly, to a low cost, low power solid-state laser which generates a visible laser beam suitable for use in numerous applications, including surveying, measurement, and equipment control in the construction and agricultural industries.

Presently, many laser based instruments utilize conventional visible light helium neon (HeNe) plasma tubes as a source of the laser beam. For further advancement and improvements in such laser based instruments, laser sources consuming much less electrical power, occupying much smaller spaces and preferably also costing less money, need to be developed.

One promising alternative to the HeNe plasma tubes for these applications is the recently developed visible laser diode, coupled with a lens system for shaping and collimating the laser beam. Unfortunately, manufacturers of these visible light laser diodes have had difficulty in commericalizing them and their emission wavelength tends to be just inside the visible band in the 670–690 nanometer (nm) region. As a consequence, for an "average" observer, anywhere from 22–68 milliwatts of beam output power is required to visibly equal the three milliwatt output power of the helium neon plasma tubes. Such power levels do not appear to be forthcoming in the near future.

Another possible replacement for the helium neon plasma tubes are solid-state lasers, for example as disclosed in U.S. Pat. Nos. 4,653,056, 4,656,635, 4,665,529 and 4,701,929. Unfortunately, these devices are generally concerned with higher power outputs and, due to the power and quality restrictions placed on the output beams generated by these devices, can only be purchased at a much higher price than the helium neon plasma tubes.

Accordingly, there is a need for an inexpensive laser which produces visible light at a level comparable to that of the three milliwatt helium neon plasma tubes presently used, which also consumes much less electrical power and occupies a much smaller space.

SUMMARY OF THE INVENTION

In accordance with the present invention, this need is met by miniature solid-state lasers having green output beams which can be reliably and economically produced. Such lasers compete visually in terms of radial symmetry and illuminance with three milliwatt helium neon gas lasers. The solid-state lasers of the present invention are concerned with aspects of visibility, spatial spot quality and spatial stability without concern for chromatic purity, amplitude stability, noise, CW operation or pulse regularity; accordingly, these solid-state lasers are particularly applicable for spatial reference applications, such as those encountered in the construction and agricultural arts.

To effect miniaturization, efficiency and low cost, a low power frequency doubled solid-state laser has been produced by bonding a laser chip of stoichiometric lasing material to a frequency doubler chip by means of coupling material having a refractive index matched to the chips. By thus bonding the chips with such coupling material, reflections at the bonded surfaces are almost eliminated to thereby increase the effective Q of a laser cavity which receives the bonded combination of the laser chip and the doubler chip at a beam waist defined within the laser cavity by means of beam shaping. A solid-state laser in accordance with the present invention will provide an ultrasmall unit approaching one milliwatt of output power at green light wavelengths with the unit occupying less than 5% of the volume of existing units and costing less than 5% of the smallest and lowest cost doubled solid-state lasers on the market today.

According to one aspect of the present invention, a compact laser diode pumped, high efficiency, solid-state laser comprises output coupler means including a mirrored surface forming a front end of a laser cavity. A back end of the laser cavity is formed by rear mirror means through which the emissions from a laser diode pass for pumping a laser chip of stoichiometric lasing material. A frequency doubler chip positioned immediately adjacent the laser chip doubles the frequency of light generated by the laser chip to thereby halve its wavelength. The laser chip is bonded to the frequency doubler chip by coupling material having a refractive index matched to the chips to almost eliminate reflections at the bonded surfaces thereof. The bonded combination of the laser chip and the doubler chip are positioned in the laser cavity to receive pumping energy from the laser diode through the rear mirror means.

The laser diode pump preferably comprises a single stripe laser diode. For higher efficiency, the solid-state laser further comprises beam shaping means for shaping the laser beam within the laser cavity to form a beam waist with the bonded combination of the laser chip and the doubler chip being positioned substantially at the beam waist. The laser chip may comprise neodymium pentaphosphate (NPP) which lases to generate infrared light near a wavelength of 1050 nm. If the infrared light generated by an NPP laser chip is frequency doubled by the doubled chip, which can comprise potassium titanyl phosphate (KTP), the resulting light is green and has a wavelength of near 525 nm which light passes through the output coupler means.

While the rear mirror means may be concave and positioned some distance from the bonded combination of the laser chip and the doubler chip, preferably it is positioned immediately adjacent the laser chip and can be formed thereon. Alternately, the rear mirror means may comprise a mirror chip of thin glass which in turn is directly bonded to the laser chip by coupling material having a refractive index matched to the laser chip and the mirror chip.

The solid-state laser of the present invention preferrably further comprises power peaking means for generating spikes in the light passed through the output coupler means. The power peaking means may comprise gain switching of the laser diode used to pump the laser chip or phase modulation techniques. Alternately, support means may be provided for movably mounting the bonded combination of the laser chip and the doubler chip. In the latter embodiment, the power peaking means may comprise vibratory means for moving the support means and thereby the bonded combination of the laser chip and the doubler chip.

According to another aspect of the present invention, a compact, laser diode pumped, high efficiency, solid-state laser comprises a hollow laser body having generally open first and second ends. A laser diode is fitted into the first end of the laser body and output coupler means are fitted into the second end and include a mirrored surface forming a front end of a laser cavity within the laser body. Input mirror means are supported within the laser body for forming a back end of the laser cavity. A laser chip of stoichiometric lasing material has a frequency doubler chip positioned immediately adjacent thereto for doubling the frequency of light generated by the laser chip thereby halving its wavelength. Coupling material bonds the laser chip to the doubler chip and has a refractive index matched to the chips to nearly eliminate reflections at the bonded surfaces of the chips. The bonded combination of the laser chip and the doubler chip are supported in the laser cavity to receive pumping energy from the laser diode through the input mirror means. Lens means comprising a spherical relay lens or GRIN relay lens may be supported between the laser diode and the input mirror means. The laser body may comprise a mounting tube which can deformed to position the output means to align the laser cavity for lasing.

Preferably, the solid-state laser includes a monolithic lasing element formed by bonding a number of glass and crystalline components together. In this embodiment, the solid-state laser further comprises a cylindrical glass member, the GRIN relay lens and input mirror means are bonded to one another and to the laser chip and the cylindrical glass member is bonded to and between the frequency doubler chip and the output coupler means to form the monolithic lasing element. The monolithic losing element is sized so that it can be slidably received within the second end of the laser body and positioned therein to maximize laser light passing through the output coupler means. Thus positioned, the monolithic lasing element is secured within the second end of the laser body to maintain maximum laser light and complete construction of the solid-state laser.

It is an object of the present invention to provide a low cost, low power solid-state laser for generating a visible laser beam having a spatial spot quality and spatial stability such that it is useful for spatial reference applications in the construction and agricultural arts; to provide a low cost, low power solid-state laser for generating a visible laser beam by means of a laser chip and a doubler chip which are bonded to one another by coupling material having a refractive index matched to the chips with the bonded combination being positioned at the beam waist of a laser cavity; and, to provide a low cost, low power solid-state laser for generating a visible laser beam by means of a laser chip and a doubler chip which are bonded to one another by coupling material having a refractive index matched to the chips with the bonded combination being supported for vibratory motion at the beam waist of a laser cavity and vibrated to spike light output by the solid-state laser.

Other objects and advantages of the invention will be apparent from the following description, the accompanying drawings and the appended claims.

BRIEF DESCRIPTION OF THE DRAWINGS

FIG. 4 is a partially cross sectioned view of a second commercial embodiment of the solid-state laser of the present invention.

DETAILED DESCRIPTION OF THE INVENTION

Figure 1:
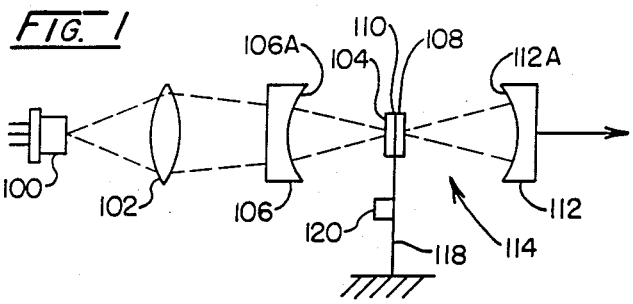
FIGS. 1 and 2 schematically show two alternate bench constructions of a solid-state laser in accordance with the present invention which were utilized to demonstrate the operability of the invention.

The bench construction shown in FIG. 1 comprises a laser diode 100, for example an LA-TOLD151-A sold by Toshiba Corporation, which emits radiation ranging from 804–810 nm in wavelength with the typical radiation being 807 nm. Collection optics, represented schematically by a lens 102, focus the emissions from the laser diode 100 onto a laser chip 104 of stoichiometric lasing material, such a NPP, with the laser chip 104 having a thickness of approximately 0.3 millimeters. The focused radiation from the lens 102 passes through input mirror means comprising an input window mirror 106 which has a concave mirror surface 106A having a radius of approximately 25 millimeters (mm) and being highly reflective of light having a wavelength of 1050 nm but highly transmissive of light having a wavelength of 807 nm.

A frequency doubler chip 108 is positioned immediately adjacent the laser chip 104 and provides for doubling the frequency of light generated by the laser chip 104 to thereby halve the light's wavelength. The doubler chip 108 preferrably comprises KTP and is of a thickness of approximately 5.0 millimeters. Coupling material 110 is used to bond the laser chip 104 to the doubler chip 108. The coupling material 110 has a refractive index matched to the two chips to substantially reduce reflections at the bonded surfaces of the chips and thereby increase the effective Q of a laser cavity which receives the bonded combination of the chips. When NPP is used for laser chip 104 and KTP is used for the doubler chip 108, it has been found that the coupling material 110 should have a refractive index of approximately 1.68 at a wavelength of 1050 nm which is provided by a mounting media sold by R. P. Cargille Laboratories, Inc. under the trade name Meltmount, catalog #24170.

Output coupler means 112 comprises a mirrored surface 112A forming a front end of the laser cavity 114 extending between the mirrored surface 106A and the mirrored surface 112A. The mirror surface 112A is highly reflective to light having a wavelength of 1050 nm but highly transmissive to light having a wavelength of 525 nm. The concave surface of the output coupler 112 has a radius of approximately 25 millimeters such that the laser cavity 114 is approximately 50 mm long.

In operation, the 807 nm light generated by the laser diode 100 is collected by the lens 102 and focused through the input window mirror 106 onto the laser chip 104 which lases to generate light having a wavelength of substantially 1050 nm. This light is passed to the frequency doubler chip 108 through the coupling material 110 and a portion of the 1050 nm light is converted to 525 nm light which passes through the output coupler 112. Since the output coupler 112 is highly transmissive to 525 nm, light, this light is emitted by the solid-state laser shown in FIG. 1 whereas 1050 nm light is reflected by the mirror surface 112A to the mirror surface 106A passing through the doubler chip 108 and the laser chip 104. Repeated passes result in additional conversion of 1050 nm light to 525 nm light resulting in its emission from the solid-state laser through the output coupler 112.

Figure 2:
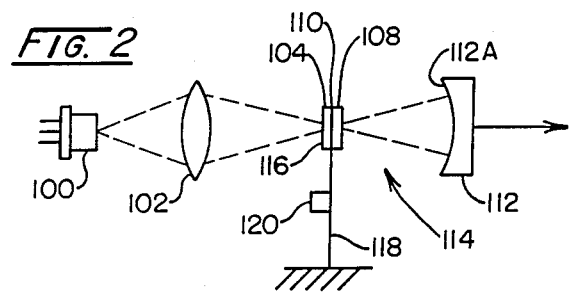

In the bench construction shown in FIG. 2, the solid-state laser is substantially the same as that shown in FIG. 1 with the exception that the input mirror means comprises a mirror coating 116 which has been formed onto the laser chip 104. Accordingly, in the bench structure of FIG. 2, the length of the laser cavity 114 has been reduced by a factor of two to approximately 25 mm.

Power peaking means is preferably provided in the solid-state laser of the present invention for generating spikes in the laser light passed through the output coupler 112. Since the development of the solid-state laser of the present application was not concerned with CW operation or pulse regularity, the power peaking means can comprise, in the embodiments of FIGS. 1 and 2, support means comprising a cantilever support member 118 for movably mounting the bonded combination of the laser chip 104 and the doubler chip 108 coupled with vibratory means for moving the support member 118 and thereby the bonded combination of the laser chip 104 and the doubler chip 108.

The vibratory means may comprise a motor 120, a moving coil modulator, or other appropriate apparatus coupled to the support member 118 for imparting velocity to the bonded combination of the laser chip 104 and the doubler chip 108 by vibrating the support member 118. The degree of spiking or peaking of the output laser light passed through the output coupler 112 of the solid-state laser due to the vibratory means is an increasing function of the velocity of the bonded combination of the laser chip 104 and the doubler chip 108. It is again noted that the motor 120 or other vibratory means may vibrate the support member 118 on an irregular basis since pulse regularity is not critical to the intended use of the solid-state laser for spatial reference applications.

Figure 3:
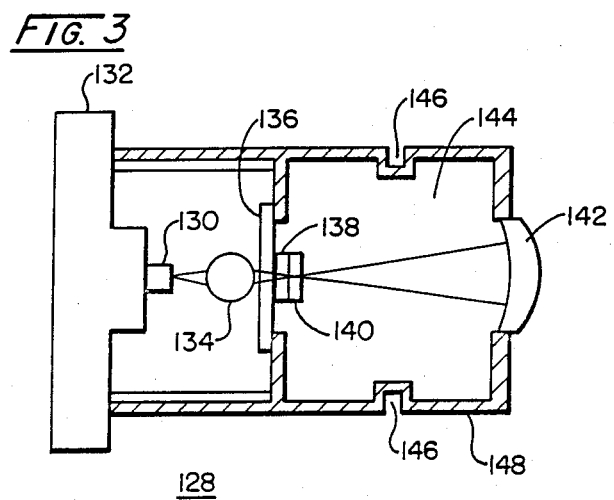
FIG. 3 is a partially cross sectioned view of a first commercial embodiment of the solid-state of the present invention.

Reference is now made to FIG. 3 which shows a partially cross sectioned view of a first commercial embodiment of a solid-state laser 128 of the present invention. Emission from a single stripe pump laser diode 130 which is supported upon a laser diode mount 132 is concentrated by lens means comprising a spherical relay lens 134 through input mirror means comprising an input window mirror 136 to a very small spot within a thin laser chip 138 of stoichiometric lasing material, for example NPP, which has a thickness on the order of 0.01 inches. The input window mirror 136 transmits the emissions from the pump laser diode 130 but reflects the light generated by the lasing action of the laser chip 138. The lasing emissions on the other hand pass through the thin slice of frequency doubling material, for example KTP, of a doubler chip 140 which also has a thickness on the order of 0.01 inches falling upon an output window mirror 142 which reflects light of the lasing wavelength but is highly transmittive of light having a wavelength which is double the lasing wavelength.

The input window mirror 136 and the output window mirror 142 form a high Q resonant laser cavity for the lasing wavelength of the laser chip 138. To keep the laser cavity Q as high as possible, the input window mirror 136 and the output window mirror 142 are coated for the highest reflectivity possible and intercavity reflection loss is nearly eliminated by optically bonding the input window mirror 136 to the laser chip 138 which is in turn optically bonded to the doubling chip 140 by means of coupling material as previously described with reference to the bench constructions of FIGS. 1 and 2.

The interface between the doubling chip 140 and air within the solid-state laser 128 is also antireflection coated. Residual reflectivity loss at the interface between the doubler chip 140 and the air within the solid-state laser 128 can be reduced by placing that interface at or near the cavity waist. Such placement can be accomplished by adding a slight radius, if necessary, to the input window mirror 136 to depart slightly from a hemispherical cavity configuration in accordance with the combined thicknesses of the laser chip 138 and the doubler chip 140. To align the laser cavity 144 for lasing, the positioning of the output window mirror 142 is adjustable by means of deformation 146 of a hollow laser body or mounting tube 148.

One of the objectives of the embodiment of the solid-state laser of FIG. 3 is to make the laser cavity Q so high by means of mirror reflectivity, optical bonding and locations of the surfaces that frequency doubling sensitivity, either due to material sensitivity or to thickness, is not critical provided internal transparency is very high. Cavity waist diameter is minimized by means of a short radius of curvature of the output window mirror 142 to maximize cavity power density at the beam waist and therefore doubling efficiency. The pump laser diode 130 can be gain switched or phase modulation techniques may be applied to obtain peak power which can be orders of magnitude above CW power levels. It should be apparent that the power peaking means of the embodiments of FIGS. 1 and 2 can also comprise gain switching or phase modulation techniques.

The solid-state laser 128 of FIG. 3 can be conveniently manufactured to have a length of approximately 0.5 inches and a diameter of approximately 0.4 inches; however, such a degree of miniaturization is not limiting and further miniaturization should be beneficial. The use of stoichiometric lasing materials having high densities of active ions, permitting usage of very short laser "rods", reduces scatter and the effect of boundary losses and also preserves the very small beam waist in which the doubler material can be located. The value of miniaturization for doubling can be realized as power density varies as the square of reciprocal beam waist and single pass doubling efficiency is proportional to power density.

FIG. 4 is a partially cross sectioned view of a second commercial embodiment of the solid-state laser of the present invention which, as of the present time, is believed to be preferred. A solid-state laser 160 as shown in FIG. 4 comprises a laser diode assembly 162 which is commerically available, for example, from the Toshiba Corporation. The diode assembly 162 is fitted into the large end 164A of a laser stepped adapter body 164 such that emissions from the laser diode assembly 162 are directed toward the small end 164B of the stepped adapter body 164.

To facilitate construction and assembly of the solid-state laser 160 of FIG. 4, a monolithic lasing element 166 is preassembled by bonding a number of glass and crystalline components together. The monolithic lasing element 166 is sized to be slidingly received within the small end 164B of the stepped adapter body 164 and comprises: lens means comprising a GRIN relay lens 168; input mirror means comprising a thin glass mirror chip 170 which defines a laser cavity mirror surface 172; a stoichiometric laser chip 174 comprising, for example, NPP; a frequency doubler chip 176 comprising, for example, KTP; a cylindrical glass element 178; and, a plano convex glass lens element 180 which defines a second laser cavity mirror surface 182 on its outer surface and serves as the laser output coupler. Each of the components 168-180 have a similar index of refraction and are bonded to one another by means of coupling material having appropriate refractive indexes to match the components which are being bonded to one another to form the monolithic lasing element 166.

Assembly of the preferred embodiment of the solid-state laser 160 of FIG. 4 is performed by initially securing the laser diode assembly 162 into the large end 164A of the stepped adapter body 164. The laser diode assembly 162 can then be activated to generate emissions which are passed through the small end 164B of the stepped adapter body 164. Preferably, the cylindrical glass element 178 is coated with an adhesive which can be selectively activated to secure the monolithic lasing element 166 into the stepped adapter body 164 and the element 166 is inserted into the small end 164B of the stepped adapter body 164. The monolithic lasing element 166 is then positioned to maximize the laser light passing through the plano convex lens 180 which forms the output coupler of the solid-state laser 160. Thus positioned, the adhesive coating upon the cylindrical glass element 178 is activated to complete the assembly of the solid-state laser 160 of FIG. 4.

One of the objectives of the embodiment of the solid-state laser 160 of FIG. 4 is to make the cavity Q as high as possible for the lasing wavelength so that doubling sensitivity, either due to material sensitivity or material thickness, is not critical to thereby provide more options for the doubling material which can be used.

The cavity Q is made high by: (1) minimizing fresnel losses by using like-index optical materials bonded with index-matched optical coupling materials as previously described, such construction also eliminates the cost of antireflection coating and permits usage of materials which can be troublesome to coat, such as NPP; (2) minimizing scattering losses by means of very thin chips of lasing and doubling materials, which chips are the greatest source of scattering; (3) utilizing highly transparent optical glasses; and, (4) utilizing state of the art cavity mirror coatings. With such minimization of losses, the doubled conversion per pass through the doubler chip can be very small but the number of passes very large such that a large percentage of the lasing energy is frequency doubled.

Doubling efficiency is enhanced geometrically by making the cavity waist diameter and hence the beam cross section diameter at the doubling medium very small by means of a short radius/large aperture exit mirror, i.e., cavity mirror surface 182. Peak power density and hence doubling frequency has been increased by "bunching the power" producing peaks up to two orders of magnitude above CW operating levels by gain switching and phase modulation techniques.

The degree of miniaturization shown is not limiting and further miniaturization should be beneficial. Key parameters to miniaturization of the solid-state laser are: (1) size commensurate with single stripe laser diode emitting areas; (2) short lasing cavity length for small beam waists and high cavity sweep frequency; and (3) very high cavity Q using state of the art coatings for cavity mirrors, low reflection boundaries clustered near the beam waist, and ultrathin sections of lasing and doubling materials for low scatter losses.

Having described the invention in detail and by way of reference to preferred embodiments thereof, it will be apparent that other modifications and variations are possible without departing from the scope of the invention defined in the appended claims.

What is claimed is:

1. A compact, laser diode pumped, high efficiency, solid-state laser comprising:
   a laser diode;
   output coupler means including a mirrored surface forming a front end of a laser cavity;
   input mirror means for forming a back end of said laser cavity;
   a laser chip of stoichiometric lasing material;
   a frequency doubler chip positioned immediately adjacent said laser chip for doubling the frequency of light generated by said laser chip thereby halving its wavelength;
   coupling material for bonding said laser chip to said doubler chip, said coupling material having a refractive index matched to said chips to nearly eliminate reflections at power peaking means for generating spikes in laser light which passes through said output coupler means; and support means for movably mounting the bonded combination of said laser chip and said doubler chip, and wherein said power peaking means includes vibratory means for moving said support means and thereby the bonded combination of said laser chip and said doubler chip.

2. A solid-state laser as claimed in claim 1 wherein said laser diode comprises a single stripe laser diode.

3. A solid-state laser as claimed in claim 1 further comprising beam shaping means for shaping the laser beam within said laser cavity to form a beam waist substantially at the bonded combination of said laser chip and said doubler chip.

4. A solid-state laser as claimed in claim 3 wherein said laser chip comprises stoichiometric neodymium compounds.

5. A solid-state laser as claimed in claim 3 wherein said laser chip comprises NPP.

6. A solid-state laser as claimed in claim 5 wherein said doubler chip comprises KTP.

7. A solid-state laser as claimed in claim 3 wherein said input mirror means is positioned immediately adjacent said laser chip.

8. A solid-state laser as claimed in claim 7 wherein said input mirror means is formed on said laser chip.

9. A solid-state laser as claimed in claim 7 wherein said input mirror means comprises a mirror chip of thin glass which is directly bonded to said laser chip by coupling material having a refractive index matched to said laser chip and said mirror chip.

10. A solid-state laser as claimed in claim 3 wherein said beam shaping means comprises said mirrored surface of said output coupler means which is concave and oriented inwardly of said laser cavity.

11. A solid-state laser as claimed in claim 1 wherein said power peaking means comprises gain switching of the laser diode used to pump said solid-state laser.

12. A solid-state laser as claimed in claim 1 wherein said power peaking means comprises phase modulation.

13. A compact, laser diode pumped, high efficiency, solid-state laser comprising:
   a hollow laser body having generally open first and second ends;
   a laser diode fitted into the first end of said laser body;
   output coupler means fitted into the second end of said laser body and including a mirrored surface forming a front end of a laser cavity within said laser body;

input mirror means supported within said laser body for forming a back end of said laser cavity;

a laser chip of stoichiometric lasing material;

a frequency doubler chip positioned immediately adjacent said laser chip for doubling the frequency of light generated by said laser chip thereby halving its wavelength; and coupling material for bonding said laser chip to said doubler chip, said coupling material having a refractive index matched to said chips to nearly eliminate reflections at the bonded surfaces thereof, the bonded combination of said laser chip and said doubler chip being supported in said laser cavity and aligned with the mirrored surface of said output coupler means by cavity adjustment means from said laser diode through said input mirror means.

14. A solid-state laser as claimed in claim 13 further comprising lens means supported between said laser diode and said input mirror means.

15. A solid-state laser as claimed in claim 14 wherein said lens means comprises a spherical relay lens.

16. A solid-state laser as claimed in claim 15 wherein said laser body comprises a mounting tube including said adjustment means, which may be deformed to position said output means to align said laser cavity for lasing.

17. A solid-state laser as claimed in claim 14 wherein said lens means comprises a GRIN relay lens.

18. A solid-state laser as claimed in claim 17 further comprising a cylindrical glass member and wherein said GRIN relay lens and said input mirror means are bonded to one another and to said laser chip, and said cylindrical glass member is bonded to and between said frequency doubler chip and said output coupler means to form a monolithic lasing element which can be slidably positioned within the second end of said laser body to define said adjustment means and to maximize laser light passing through said output coupler means said monolithic lasing element being secured within the second end of said laser body to maintain maximum laser light.

* * * * *